US008901209B2

(12) United States Patent
Correa et al.

(10) Patent No.: US 8,901,209 B2
(45) Date of Patent: Dec. 2, 2014

(54) WOOD-PLASTIC COMPOSITE WITH IMPROVED THERMAL AND WEATHERING RESISTANCE AND METHOD OF MAKING THE SAME

(75) Inventors: Carlos Alberto Flavio Correa, Itatiba (BR); Joao Carlos Girioli, Ribeirão Preto (BR); Paulo Aparecido dos Santos, Vinhedo (BR)

(73) Assignee: Sabic Global Technologies B.V. (NL)

( * ) Notice: Subject to any disclaimer, the term of this patent is extended or adjusted under 35 U.S.C. 154(b) by 373 days.

(21) Appl. No.: 13/090,639

(22) Filed: Apr. 20, 2011

(65) Prior Publication Data

US 2012/0178855 A1    Jul. 12, 2012

Related U.S. Application Data

(60) Provisional application No. 61/326,331, filed on Apr. 21, 2010.

(51) Int. Cl.
| | |
|---|---|
| *C08L 23/00* | (2006.01) |
| *C08L 23/12* | (2006.01) |
| *C08L 23/14* | (2006.01) |
| *C08L 23/16* | (2006.01) |
| *C08L 77/00* | (2006.01) |
| *C08L 77/02* | (2006.01) |
| *C08L 97/02* | (2006.01) |
| *C08L 1/00* | (2006.01) |
| *C08K 5/524* | (2006.01) |
| *C08K 5/00* | (2006.01) |
| *C08K 5/3492* | (2006.01) |

(52) U.S. Cl.
CPC .............. *C08L 23/12* (2013.01); *C08K 5/005* (2013.01); *C08K 5/3492* (2013.01); *C08K 5/524* (2013.01); *C08L 1/00* (2013.01); *C08L 23/00* (2013.01); *C08L 23/14* (2013.01); *C08L 23/16* (2013.01); *C08L 77/00* (2013.01); *C08L 77/02* (2013.01); *C08L 97/02* (2013.01)
USPC ................... 524/14; 524/9; 524/13

(58) Field of Classification Search
CPC .......... C08K 5/524; C08K 5/005; C08K 5/34; C08K 5/3492; C08L 23/00; C08L 23/12; C08L 23/14; C08L 23/16; C08L 77/00; C08L 97/02; C08L 2666/02
USPC ................................. 524/13, 9, 14
See application file for complete search history.

(56) References Cited

U.S. PATENT DOCUMENTS

| | | | |
|---|---|---|---|
| 5,237,008 A | 8/1993 | Kosinski | |
| 6,306,939 B1 | 10/2001 | Gupta et al. | |
| 6,306,969 B1 | 10/2001 | Patel et al. | |
| 6,903,149 B2 | 6/2005 | Yasuda et al. | |
| 2002/0040557 A1 | 4/2002 | Felton | |
| 2002/0091218 A1 | 7/2002 | Ford et al. | |
| 2002/0161072 A1 | 10/2002 | Jacoby et al. | |
| 2002/0161075 A1 | 10/2002 | Sassi | |
| 2003/0018105 A1 | 1/2003 | Baker | |
| 2003/0021915 A1 | 1/2003 | Rohatgi et al. | |
| 2003/0176538 A1 | 9/2003 | Wu et al. | |
| 2004/0235983 A1 | 11/2004 | Stadler et al. | |
| 2005/0013984 A1 | 1/2005 | Dijk et al. | |
| 2005/0019561 A1 | 1/2005 | Gassan et al. | |
| 2005/0031724 A1 | 2/2005 | Pabedinskas | |
| 2005/0038226 A1 | 2/2005 | Ratzsch et al. | |
| 2005/0049346 A1 | 3/2005 | Blanchard et al. | |
| 2005/0148698 A1 | 7/2005 | Ratzsch et al. | |
| 2006/0100317 A1 | 5/2006 | Ratzsch et al. | |
| 2006/0106136 A1 | 5/2006 | Abu-Sharkh | |
| 2006/0183821 A1* | 8/2006 | Kaspers et al. ................. 524/13 |
| 2006/0208387 A1 | 9/2006 | Zodl | |
| 2007/0125601 A1 | 6/2007 | Lutze | |
| 2007/0141316 A1 | 6/2007 | McGrath et al. | |
| 2007/0249742 A1 | 10/2007 | Howie, Jr. et al. | |
| 2007/0267609 A1 | 11/2007 | Ratzsch et al. | |
| 2008/0029926 A1 | 2/2008 | Steinwender et al. | |
| 2008/0206537 A1 | 8/2008 | Van Raemdonck | |
| 2008/0213521 A1 | 9/2008 | Halahmi et al. | |
| 2008/0214699 A1 | 9/2008 | Halahmi et al. | |
| 2008/0319112 A1 | 12/2008 | Halahmi et al. | |

FOREIGN PATENT DOCUMENTS

| | | |
|---|---|---|
| DE | 102004061767 | 7/2006 |
| DE | 202006018816 | 2/2007 |
| EP | 1089985 | 4/2001 |
| EP | 1268616 | 1/2003 |

(Continued)

OTHER PUBLICATIONS

German Patent No. 102004061767 (A1); Publication Date: Jul. 6, 2006; Abstract Only; 1 Page.

(Continued)

*Primary Examiner* — Angela C Scott
(74) *Attorney, Agent, or Firm* — Cantor Colburn LLP

(57) ABSTRACT

Thermoplastic compositions containing a natural filler and, more specifically, thermoplastic compositions containing a natural filler and having improved thermal and weathering resistance. The wood-plastic composites utilize a cellulose filler, such as wood flour, and vegetal fibers, such as Curauá fiber, as a reinforcement filler. The issues with regard to thermal degradation of cellulose during processing are reduced through the use of specific additives designed to improve its performance during processing. Additionally, other additives are included to improve the UV resistance. Specific combinations of thermal stabilizer and UV additive are provided that enhance the thermal resistance and weathering resistance of the compositions as compared to prior art systems.

17 Claims, 3 Drawing Sheets

(56) References Cited

FOREIGN PATENT DOCUMENTS

| EP | 1623809 | 2/2006 |
|---|---|---|
| FR | 2918378 | 1/2009 |
| JP | 2003306568 | 10/2003 |
| WO | 9623023 | 8/1996 |
| WO | 9634045 | 10/1996 |
| WO | 03033227 | 4/2003 |
| WO | 2006087269 | 8/2006 |
| WO | 2007104689 | 9/2007 |
| WO | 2008074878 | 6/2008 |
| WO | 2008105877 | 9/2008 |
| WO | 2009026691 | 3/2009 |
| WO | 2009029095 | 3/2009 |

OTHER PUBLICATIONS

German Patent No. 202006018816 (U1); Publication Date: Feb. 15, 2007; Abtract Only; 1 Page.
French Patent No. 2918378; Publication Date: Jan. 9, 2009; Abstract Only; 1 Page.
International Search Report; International Application No. PCT/IB2011/051741; International Filing Date: Apr. 20, 2011; Date of Mailing: Dec. 5, 2011; 4 Pages.
Written Opinion of the International Searching Authority; International Application No. PCT/IB2011/051741; International Filing Date: Apr. 20, 2011; Date of Mailing: Dec. 5, 2011; 7 pages.
Ciba® IRGANOX® B 215; "Synergistic Processing and Long-Term Thermal Stabilizer System"; Ciba Specialty Chemicals, Inc.; FEB-01; 2 pgs.

* cited by examiner

US 8,901,209 B2

WOOD-PLASTIC COMPOSITE WITH IMPROVED THERMAL AND WEATHERING RESISTANCE AND METHOD OF MAKING THE SAME

CROSS REFERENCE TO RELATED APPLICATIONS

The present application claims priority to U.S. Provisional Patent Application No. 61/326,331 filed Apr. 21, 2010, which is hereby incorporated by reference in its entirety.

FIELD OF THE INVENTION

The present invention relates to thermoplastic compositions containing a natural filler and, specifically thermoplastic compositions containing a natural filler and having improved thermal and weathering resistance.

BACKGROUND OF THE INVENTION

The use of cellulosic fillers in thermoplastics has occurred for at least three decades particularly in the automobile industry. The car industry has utilized wood plastic composites including polypropylene resins melt compounded with woodflour. These wood-plastic composites as they are known today are extruded sheets for indoor parts of some vehicles.

Nonetheless, only a few inroads have been made in using wood-plastic composites in other markets. There are some records about the use of biofibers and cellulosic composites in pencil manufacturing, stationary, fencing and crossties since these areas are seeing the advantages of wood-plastic composites in comparison to conventional wood, such as dimensional stability, lower moisture absorption, fungii resistance and weathering resistance. The woodplastic and vegetal fiber composites can also be entirely recyclable and can be manufactured by means of traditional thermoplastics processing routes as extrusion, injection molding, calendering and so forth. Such characteristics are making the wood composites particularly attractive in many applications for the building industry, injection molded car parts, household appliances and mostly extruded profiles for widespread devices including furniture.

Wood-polymer composites are thermoplastic as compared to products made from lumber alone, and advantageously processed into various shapes. A wood-polymer composite, when seen as a thermoplastic resin, is advantageous in that it affords woody texture, such as appearance (e.g., color tone, gloss etc.), a touch (e.g., thermal conduction, surface roughness) and the like, which are characteristic of lumber, decreases coefficient of thermal expansion, is light weight as compared to inorganic filler products, and so on. Moreover, end lumber pieces, scrap wood, sawdust and the like, which are produced in the lumbering industry, can be used as the wood flour for wood-polymer composites, thereby enabling effective utilization of non-used resources.

However, one of the main problems faced by wood-plastic composites processors is the hygroscopic nature of the wood and, in particular, the relatively low degradation temperature of the cellulose. Thermooxidative degradation of cellulose starts at around 200° C., which severely limits its use in engineering plastics as a substitute for glass fibers. Further, for outdoor applications, fading and yellowness of the composite may occur under ultraviolet (UV) and weathering exposure.

Therefore there is a need for wood-plastic compositions that has improved thermal characteristics and/or improved weatherability.

SUMMARY OF THE INVENTION

The present invention provides thermoplastic compositions containing a natural filler and, more specifically, thermoplastic compositions containing a natural filler and having improved thermal and weathering resistance. The compositions of the present invention are wood-plastic and vegetal fiber composites using cellulose fillers, such as wood flour and Curauá fiber, to provide a reinforcement filler and/or wood aesthetics. The issues with regard to thermal degradation of cellulose during processing are reduced by enhancing the thermal stabilization of the cellulose through the use of specific additives designed to improve its performance during processing. Additionally, other additives are included to improve the UV resistance as measured by yellowness index and fading such that weatherability problems associated with prior art compositions are reduced. Finally, as the use of some thermal stabilizers and/or UV additives in polymer compositions is known, the present invention provides a specific combination of thermal stabilizer and UV additive that unexpectedly enhances the thermal resistance and weathering resistance of the compositions as compared to alternative thermal stabilizers and/or UV additives.

Accordingly, disclosed herein is a wood-plastic composition including from 40 to 90 wt % of a polyolefin or polyamide, from 10 to 60 wt % of a wood filler; from 0.01 to 1.0 wt % of a thermal stabilizer comprising a blend of an organophosphite and a hindered phenolic antioxidant; and from 0.01 to 1.0 wt % of an ultraviolet stabilizer comprising a blend of an ultraviolet absorbers and a hindered amine light stabilizer.

Also disclosed herein is a method of making wood-plastic compositions including the steps of blending from 40 to 90 wt % of a polyolefin or polyamide, from 10 to 60 wt % of a wood filler; from 0.01 to 1.0 wt % of a thermal stabilizer comprising a blend of an organophosphite and a hindered phenolic antioxidant; and from 0.01 to 1.0 wt % of an ultraviolet stabilizer comprising a blend of an ultraviolet absorbers and a hindered amine light stabilizer; and molding the polymer composition.

DETAILED DESCRIPTION OF THE INVENTION

Figure 1:
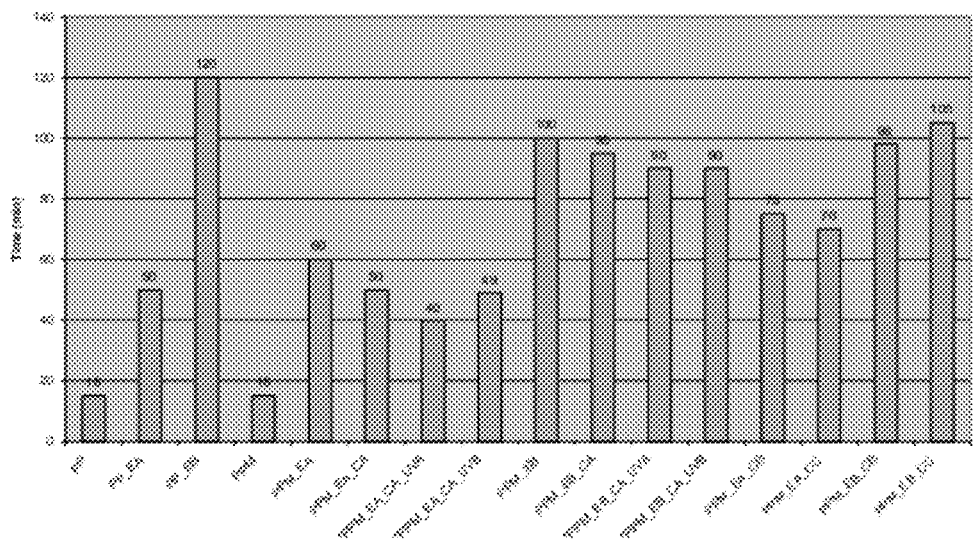
FIG. 1 is a graph of oxidative induction times of various samples of wood-plastic composites.

The present invention is more particularly described in the following description and examples that are intended to be illustrative only since numerous modifications and variations therein will be apparent to those skilled in the art. As used in the specification and in the claims, the term "comprising" may include the embodiments "consisting of" and "consisting essentially of" All ranges disclosed herein are inclusive of the endpoints and are independently combinable. The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value.

The present invention provides thermoplastic compositions containing a natural filler and, more specifically, thermoplastic compositions containing a natural filler and having improved thermal and weathering resistance. The present invention describes wood-plastic composites having a cellulose filler, such as wood flour and Curauá fiber. The cellulose filler is used as a natural alternative to other reinforcing filler, such as glass fiber. The issues regarding the thermal degradation of cellulose during processing are reduced by enhancing the thermal stabilization of the cellulose through the use of specific additives designed to improve thermal stability during processing. In addition, other additives are included to improve the UV resistance such that weatherability problems associated with prior art compositions (e.g. yellowness index and fading) are reduced. As the use of some thermal stabilizers and/or UV additives in polymer compositions is known, the present invention also provides a specific combination of thermal stabilizers and UV additives that provides unexpectedly better thermal resistance and weathering resistance of the compositions, as compared to alternative thermal stabilizers and/or UV additives, due to the presence of the natural filler in the compositions.

Accordingly, in a first aspect, the compositions of the present invention include a thermoplastic resin. Thermoplastic resins that may be in the present invention include, but are not limited to, polyolefins alone, polyamides alone or blends of polyamides and polyolefins. Examples of polyolefins that may be used in the present invention include, but are not limited to, polypropylene, thermoplastic elastomers and polyethylene or subset plastic materials within each one of these members. For example, homopolymer or copolymer of polypropylene, high impact co-polymer polypropylene, random co-polymer polypropylene, atactic polypropylene, crosslinked polypropylene (XLPP), low density polyethylene (VLDPE), low density polyethylene (LDPE), medium density polyethylene (MDPE), high density polyethylene (HDPE), linear low density polyethylene (LLDPE), crosslinked polyethylene (XLPE), and ethylene/vinyl acetate copolymer (EVA). Similarly, thermoplastic elastomers may be based on polypropylene or polyethylene backbones and may further contain dispersed rubber particles that may be either thermoplastic or thermoset (e.g. dynamically vulcanized). Examples include but are not limited to ethylene propylene diene monomer (EPDM), maleated propylene diene monomer (m-EPDM), ethylene-polypropylene copolymer, maleated ethylene-polypropylene copolymer (m-EP copolymers). Also included are styrene polymers such as polystyrene, substituted polystyrene and impact-modified polystyrene containing rubber such as butadiene, acrylonitrile butadiene styrene and other styrene containing copolymers.

Examples of polyamides that may be used in the present invention include, but are not limited to nylon 6, nylon 6,6, nylon 4,6, nylon 6, 12, nylon 10, or the like, or combinations including at least one of the foregoing polyamides.

In one embodiment of the present invention, one of the thermoplastic resins used is polypropylene. Examples of polypropylenes useful in the present invention include Equistar® PP 1610 PF and Basell® SE 191. An example of VLDPE is Exact® 3022, made by Exxon Mobil Chemical, which has a density of 0.905 and a melt index of 9 g/10 min. Poly(4-methyl-1-pentene) is a polymer of 4-methylpentene-1 which is similar to polypropylene but has an isobutyl group in place of the methyl group on alternate carbon atoms. An example grade of 4-methylpentene-1 is TPX® from Mitsui Petrochemicals Ltd. Any grade polypropylene mixed with a co-polymer material including, but not limited to, ethylene can be used in the present invention. Examples of polypropylenes useful in the present invention include PP copolymer EP300K from Montell.

As discussed, the thermoplastic compositions of the present invention may include a polyamide, either alone or blended with a polyolefin. Accordingly, in another embodiment, the thermoplastic compositions of the present invention may include a nylon-based resin, such as a polyamide. Polyamides are generally derived from the polymerization of organic lactams having from 4 to 12 carbon atoms. In one embodiment, the lactams are represented by the formula (I)

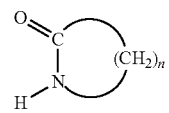

(I)

wherein n is 3 to 11. In one embodiment, the lactam is epsilon-caprolactam having n equal to 5.

Polyamides may also be synthesized from amino acids having from 4 to 12 carbon atoms. In one embodiment, the amino acids are represented by the formula (II)

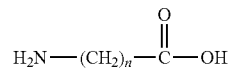

(II)

wherein n is 3 to 11. In one embodiment, the amino acid is epsilon-aminocaproic acid with n equal to 5.

Polyamides may also be polymerized from aliphatic dicarboxylic acids having from 4 to 12 carbon atoms and aliphatic diamines having from 2 to 12 carbon atoms. In one embodiment, the aliphatic diamines are represented by the formula (III)

(III)

wherein n is about 2 to about 12. In one embodiment, the aliphatic diamine is hexamethylenediamine ($H_2N(CH_2)_6NH_2$). In one embodiment, the molar ratio of the dicarboxylic acid to the diamine is from 0.66 to 1.5. Within this range it is generally beneficial to have the molar ratio be greater than or equal to 0.81. In another embodiment, the molar ratio is greater than or equal to 0.96. In yet another embodiment, the molar ratio is less than or equal to 1.22. In still another embodiment, the molar ratio is less than or equal to 1.04. Examples of polyamides that are useful in the present invention include, but are not limited to, nylon 6, nylon 6,6, nylon 4,6, nylon 6, 12, nylon 10, or the like, or combinations including at least one of the foregoing polyamides.

Synthesis of polyamideesters may also be accomplished from aliphatic lactones having from 4 to 12 carbon atoms and aliphatic lactams having from 4 to 12 carbon atoms. The ratio of aliphatic lactone to aliphatic lactam may vary widely depending on the selected composition of the final copolymer, as well as the relative reactivity of the lactone and the lactam. In one embodiment, the initial molar ratio of aliphatic lactam to aliphatic lactone is 0.5 to 4. Within this range a molar ratio of greater than or equal to about 1 is beneficial. In another embodiment, a molar ratio of less than or equal to 2 is utilized.

The composition may further include a catalyst or an initiator. Generally, any known catalyst or initiator suitable for the corresponding thermal polymerization may be used. Alternatively, the polymerization may be conducted without a catalyst or initiator. For example, in the synthesis of polyamides from aliphatic dicarboxylic acids and aliphatic diamines, no catalyst may be used in select embodiments.

For the synthesis of polyamides from lactams, suitable catalysts include water and the omega-amino acids corresponding to the ring-opened (hydrolyzed) lactam used in the synthesis. Other suitable catalysts include metallic aluminum alkylates ($MAl(OR)_3H$; wherein M is an alkali metal or alkaline earth metal, and R is $C_1$-$C_{12}$ alkyl), sodium dihydrobis(2-methoxyethoxy)aluminate, lithium dihydrobis(tert-butoxy)aluminate, aluminum alkylates ($Al(OR)_2R$; wherein R is $C_1$-$C_{12}$ alkyl), N-sodium caprolactam, magnesium chloride or bromide salt of epsilon-caprolactam ($MgXC_6H_{10}NO$, X=Br or Cl), dialkoxy aluminum hydride. Suitable initiators include isophthaloybiscaprolactam, N-acetalcaprolactam, isocyanate epsilon-caprolactam adducts, alcohols (ROH; wherein R is $C_1$-$C_{12}$ alkyl), diols (HO—R—OH; wherein R is R is $C_1$-$C_{12}$ alkylene), omega-aminocaproic acids, and sodium methoxide.

For the synthesis of polyamideesters from lactones and lactams, suitable catalysts include metal hydride compounds, such as a lithium aluminum hydride catalysts having the formula $LiAl(H)_x(R^1)_y$, where x is 1 to 4, y is 0 to 3, x+y is equal to 4, and $R^1$ is selected from the group consisting of $C_1$-$C_{12}$ alkyl and $C_1$-$C_{12}$ alkoxy; highly beneficial catalysts include $LiAl(H)(OR^2)_3$, wherein $R^2$ is selected from $C_1$-$C_8$ alkyl; an especially beneficial catalyst is $LiAl(H)(OC(CH_3)_3)_3$. Other suitable catalysts and initiators include those described above for the polymerization of poly(epsilon-caprolactam) and poly(epsilon-caprolactone).

Specific non-limiting examples of polyamides that may be used in the present invention include, but are not limited to, nylon-6, nylon-6,6, nylon-4, nylon-4,6, nylon-12, nylon-6,10, nylon-6,9, nylon-6,12, nylon-9T, copolymer of nylon-6,6 and nylon-6, polyamide copolymers, polyamide blends, and combinations thereof.

The thermoplastic resin, in one embodiment, makes up 40 to 90 percent by weight of the wood-plastic composition of the present invention. In another embodiment, the composition includes 45 to 85 percent by weight of a thermoplastic resin. In yet another embodiment, the composition includes 50 to 80 percent by weight of a thermoplastic resin. When the thermoplastic resin includes a blend of a polyolefin and a polyamide, the amount of polyamide used in the compositions of the present invention, in one embodiment, may be from 1 to 30 percent by weight with the remainder being a polyolefin. In another embodiment, the composition includes 3 to 20 percent by weight of polyamide with the remainder being a polyolefin. In yet another embodiment, the composition includes 5 to 15 percent by weight of polyamide with the remainder being a polyolefin. Alternatively, the amount of polyolefin used in the compositions of the present invention, in one embodiment, may be from 1 to 30 percent by weight with the remainder being a polyamide. In another embodiment, the composition includes 3 to 20 percent by weight of polyolefin with the remainder being a polyamide. In yet another embodiment, the composition includes 5 to 15 percent by weight of polyolefin with the remainder being a polyamide.

The compositions of the present invention also include a natural filler. In one embodiment, the natural filler is wood flour. The wood flour that may be used in the present invention may be any generally used wood fines. Examples of such wood flour include, but are not limited to, wood flour derived from pine, cedar, lauan, cypress, hemlock and the like. In another embodiment, the wood filler is a vegetal fiber. Examples of vegetal fibers include, but are not limited to, Curauá fiber, Sisal fiber, Jute fiber, or combinations including at least one of the foregoing vegetal fibers.

The total amount of natural filler present in the composition may be 10 to about 60 weight percent, more specifically from 15 to from 50 weight percent, or even more specifically from 30 to 40 weight percent based on the total weight of the composition.

In addition to the thermoplastic resin and the natural filler, the compositions of the present invention also include a thermal stabilizer. As previously discussed, it has been found that certain thermal stabilizers, when used with particular UV stabilizers in compositions including wood flour, achieve better thermal resistance for the wood flour than when these thermal stabilizers are used alone or in compositions not including wood flour. Exemplary embodiments of thermal stabilizers useful in the present invention include, but are not limited to, synergistic blends of low volatility and hydrolysis-resistant organophosphites and hindered phenolic antioxidants. Specific examples of thermal stabilizers useful in the present invention include, but are not limited to, blend systems containing 1,3,5-Tris(4-tert-butyl-3-hidroxy-2,6-dimethyl benzyl)-1,3,5-triazine-(1H,3H,% H)-trione and Tris(2,4-di-t-butylphenyl)phosphite.

The amount of thermal stabilizer used in the compositions of the present invention, in one embodiment, may be from 0.01 to 1.0 percent by weight. In another embodiment, the composition includes 0.1 to 0.8 percent by weight of the thermal stabilizer. In yet another embodiment, the composition includes 0.2 to 0.5 percent by weight of the thermal stabilizer.

In addition to the thermoplastic resin, the natural filler and the thermal stabilizer, the compositions also include a UV stabilizer for enhancing the weatherability. As previously discussed, it has been found that certain UV stabilizers, when used with particular thermal stabilizers in compositions including wood flour, achieve better weatherability for the wood flour than when these UV stabilizers are used alone or in compositions not including wood flour. Exemplary embodiments of UV stabilizers useful in the present invention include, but are not limited to, UV absorbers (UVAs) that act by shielding the composition from ultraviolet light or hindered amine light stabilizers (HALS) that act by scavenging the radical intermediates formed in the photo-oxidation process. Commercially, the UV stabilizers are available as benzophenones and benzotriazoles. Specific examples of the UV stabilizers used in the present invention include UVA+HALS blends and high molecular weight blends based on synergistic combination of tertiary and secondary amines. Also UV stabilizers including blends of UVA+HALS in a polypropylene PP vehicle and/or UVA based on 2-hydroxy-benzophenone.

The amount of UV stabilizer used in the compositions of the present invention, in one embodiment, may be from 0.01 to 1.0 percent by weight. In another embodiment, the composition includes 0.1 to 0.8 percent by weight of the UV stabilizer. In yet another embodiment, the composition includes 0.2 to 0.5 percent by weight of the UV stabilizer.

Other customary additives may be added to all of the resin compositions at the time of mixing or molding of the resin in amounts as necessary which do not have any deleterious effect on physical properties. For example, coloring agents (pigments or dyes), oxidation inhibitors, impact modifiers, lubricants, mold release agents, plasticizers, and fluidity enhancing agents, and the like, may be added.

Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates; sulfates and chromates; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations including at least one of the foregoing pigments. Pigments are generally used in amounts of from 1 to 10 parts by weight, based on 100 parts by weight based on 100 parts by weight of the total composition, excluding any filler.

Suitable dyes include, for example, organic dyes such as coumarin 460 (blue), coumarin 6 (green), nile red or the like; lanthanide complexes; hydrocarbon and substituted hydrocarbon dyes; polycyclic aromatic hydrocarbons; scintillation dyes (preferably oxazoles and oxadiazoles); aryl- or heteroaryl-substituted poly (2-8 olefins); carbocyanine dyes; phthalocyanine dyes and pigments; oxazine dyes; carbostyryl dyes; porphyrin dyes; acridine dyes; anthraquinone dyes; arylmethane dyes; azo dyes; diazonium dyes; nitro dyes; quinone imine dyes; tetrazolium dyes; thiazole dyes; perylene dyes, perinone dyes; bis-benzoxazolylthiophene (BBOT); and xanthene dyes; fluorophores such as anti- stokes shift dyes which absorb in the near infrared wavelength and emit in the visible wavelength, or the like; luminescent dyes such as 5-amino-9-diethyliminobenzo(a)phenoxazonium perchlorate; 7-amino-4-methylcarbostyryl; 7-amino-4-methylcoumarin; 3-(2'-benzimidazolyl)-7-N,N-diethylaminocoumarin; 3-(2'-benzothiazolyl)-7-diethylaminocoumarin; 2-(4-biphenylyl)-5-(4-t-butylphenyl)-1,3,4-oxadiazole; 2-(4-biphenyl)-6-phenylbenzoxazole-1,3; 2,5-Bis-(4-biphenylyl)-1,3,4-oxadiazole; 2,5-bis-(4-biphenylyl)-oxazole; 4,4'-bis-(2-butyloctyloxy)-p-quaterphenyl; p-bis(o-methylstyryl)-benzene; 5,9-diaminobenzo(a) phenoxazonium perchlorate; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-diethylamino-4-methylcoumarin; 7-diethylamino-4-trifluoromethylcoumarin; 2,2'-dimethyl-p-quaterphenyl; 2,2-dimethyl-p-terphenyl; 7-ethylamino-6-methyl-4-trifluoromethylcoumarin; 7-ethylamino-4-trifluoromethylcoumarin; nile red; rhodamine 700; oxazine 750; rhodamine 800; IR 125; IR 144; IR 140; IR 132; IR 26; IR5; diphenylhexatriene; diphenylbutadiene; tetraphenylbutadiene; naphthalene; anthracene; 9,10-diphenylanthracene; pyrene; chrysene; rubrene; coronene; phenanthrene or the like, or combinations including at least one of the foregoing dyes. Dyes are generally used in amounts of from 0.1 to 5 parts by weight, based on 100 parts by weight of the total composition, excluding any filler.

Suitable colorants include, for example titanium dioxide, anthraquinones, perylenes, perinones, indanthrones, quinacridones, xanthenes, oxazines, oxazolines, thioxanthenes, indigoids, thioindigoids, naphthalimides, cyanines, xanthenes, methines, lactones, coumarins, bis-benzoxazolylthiophene (BBOT), napthalenetetracarboxylic derivatives, monoazo and disazo pigments, triarylmethanes, aminoketones, bis(styryl)biphenyl derivatives, and the like, as well as combinations including at least one of the foregoing colorants. Colorants are generally used in amounts of from 0.1 to 5 parts by weight, based on 100 parts by weight of the total composition, excluding any filler.

Suitable lubricants include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants are generally used in amounts of from 0.1 to 5 parts by weight, based on 100 parts by weight of the total composition, excluding any filler.

Suitable mold releasing agents include for example, stearyl stearate, pentaerythritol tetrastearate, beeswax, montan wax, paraffin wax, or the like, or combinations including at least one of the foregoing mold release agents. Mold releasing agents are generally used in amounts of from 0.1 to 1.0 parts by weight, based on 100 parts by weight of the total composition, excluding any filler.

Suitable plasticizers include, for example, phthalic acid esters such as dioctyl-4,5-epoxy-hexahydrophthalate, tris-(octoxycarbonylethyl)isocyanurate, tristearin, epoxidized soybean oil or the like, or combinations including at least one of the foregoing plasticizers. Plasticizers are generally used in amounts of from 0.5 to 3.0 parts by weight, based on 100 parts by weight of the total composition, excluding any filler.

Additionally, materials to improve flow and other properties may be added to the composition, such as low molecular weight hydrocarbon resins. Particularly useful classes of low molecular weight hydrocarbon resins are those derived from petroleum $C_5$ to $C_9$ feedstock that are derived from unsaturated $C_5$ to $C_9$ monomers obtained from petroleum cracking. Non-limiting examples include olefins, e.g. pentenes, hexenes, heptenes and the like; diolefins, e.g. pentadienes, hexadienes and the like; cyclic olefins and diolefins, e.g. cyclopentene, cyclopentadiene, cyclohexene, cyclohexadiene, methyl cyclopentadiene and the like; cyclic diolefin dienes, e.g., dicyclopentadiene, methylcyclopentadiene dimer and the like; and aromatic hydrocarbons, e.g. vinyltoluenes, indenes, methylindenes and the like. The resins can additionally be partially or fully hydrogenated.

Examples of commercially suitable low molecular weight hydrocarbon resins derived from petroleum $C_5$ to $C_9$ feedstock include the following: hydrocarbon resins available from Eastman Chemical under the trademark Piccotac®, the aromatic hydrocarbon resins available from Eastman Chemical under the trademark Picco®, the fully hydrogenated alicyclic hydrocarbon resin based on $C_9$ monomers available from Arakawa Chemical Inc. under the trademark ARKON® and sold, depending on softening point, as ARKON® P140, P125, P115, P100, P90, P70 or the partially hydrogenated hydrocarbon resins sold as ARKON® M135, Ml 15, M100 and M90, the fully or partially hydrogenated hydrocarbon resin available from Eastman Chemical under the tradename REGALITE® and sold, depending on softening point, as REGALITE® R1100, S1100, R1125, R1090 and R1010, or the partially hydrogenated resins sold as REGALITE®

R7100, R9100, 55100 and 57125, the hydrocarbon resins available from Exxon Chemical under the trade ESCOREZ®, sold as the ESCOREZ® 1000, 2000 and 5000 series, based on C5, C9 feedstock and mixes thereof, or the hydrocarbon resins sold as the ESCOREZ® 5300, 5400 and 5600 series based on cyclic and C9 monomers, optionally hydrogenated and the pure aromatic monomer hydrocarbon resins such as for instance the styrene, α-methyl styrene based hydrocarbon resins available from Eastman Chemical under the tradename Kristalex®. Low molecular weight hydrocarbon resins are generally used in amounts of from 0.1 to 10 parts by weight, based on 100 parts by weight of the total composition, excluding any filler.

The thermoplastic compositions can be manufactured by methods known in the art, for example in one embodiment, in one manner of proceeding, the UV additive, the thermal stabilizer, the natural filler and any optional polyamide and/or other optional components are first blended in a Henschel™ high speed mixer. Other low shear processes including but not limited to hand mixing may also accomplish this blending. The blend may be formed by mixing in single or twin-screw type extruders or similar mixing devices that can apply a shear to the components. In one embodiment, separate extruders are used in the processing of the blend. In another embodiment, the composition is prepared by using a single extruder having multiple feed ports along its length to accommodate the addition of the various components. A vacuum may be applied to the melt through at least one or more vent ports in the extruder to remove volatile impurities in the composition.

The blend is then fed into the throat of an extruder via a hopper. Alternatively, one or more of the components may be incorporated into the composition by feeding directly into the extruder at the throat and/or downstream through a side-stuffer. Such additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets so prepared when cutting the extrudate may be one-fourth inch long or less as desired. Such pellets may be used for subsequent molding, shaping, or forming.

In one embodiment of the invention, the compositions are used to prepare molded articles such as for example, durable articles, structural products, and the like. The composition may be used to prepare molded articles including, but not limited to, building industry products, cosmetic packaging, injection-molded car parts, garden furniture, household appliances and mostly extruded profiles for widespread devices including furniture.

The following examples, which are meant to be exemplary, not limiting, illustrate compositions and methods of manufacturing of some of the various embodiments of the halogen free flame retardant polymer compositions and the methods of manufacture described herein.

EXAMPLES

The invention is further illustrated by the following examples.

Example 1

The formulations for the Example 1 were prepared from the components listed in Table 1 below.

The manufacturing process of compositions having enhanced thermal resistance and UV resistance was performed as follows. Preparation of the wood plastic polyolefin-based composite was performed using a polypropylene copolymer (PPco) with woodflour, compatibilizers, lubricants, thermal and UV stabilizers. The formulations used in these examples used components and their amounts as described on Table 1. It should be noted that the amount of the polypropylene and wood flour varied based on whether any given sample included wood flour or not. In those embodiments wherein only polypropylene was used, the compositions included 100 parts (or 100 wt % exclusive of any additives) and in embodiments including wood flour, the compositions included 70 parts polypropylene and 30 parts wood flour (again totalling 100 wt % exclusive of any additives). The amount(s) of thermal stabilizer, UV stabilizer, lubricant and compatibilizer were always 0.3 parts, 0.5 parts, 1.0 parts and 3.0 parts respectively when those components were used in a given sample.

TABLE 1

Components

| | Concentration (parts) | Product |
|---|---|---|
| Polypropylene Copolymer | 70-100 | Polypropylene copolymer Flor index 25 g/10 min |
| Thermal Stabilizers | 0.3 | Blends of low volatility and high resistant to hydrolysis organophosphites and hindered phenolic antioxidants Antioxidant blend systems containing 1,3,5-Tris(4-tert-butyl-3-hidroxy-2,6-dimethyl benzyl)-1,3,5-triazine-(1H,3H,% H)-trione and Tris (2,4-di-t-butylphenyl) phosphite |
| UV Stabilizers | 0.5 | UV stabilizers UVA + HALS blends and high molecular weight blend based on synergistic combination of tertiary and secondary amines. UVA + HALS blends with PP vehicle. UVA based on 2-hydroxy-benzophenone |
| Lubricant | 1.0 | modified fatty acid ester |
| Compatibilizer | 3.0 | Maleic Anhydride Grafted Polypropylene (1% graft/120 g/10 min) Maleic Anhydride Grafted Polypropylene (1% graft/110 g/10 min) Tri-alkoxy silano Molecular weight ~220.00 g/mol Maleic anhydride modified wax. Average molecular weight: Mn ~3.900 and Mw ~9.100 g/mol |

TABLE 1-continued

| | Components | |
|---|---|---|
| | Concentration (parts) | Product |
| Woodflour | 0-30 | *Pinus elliotti* mesh #35 (5 to 12 wt % moisture) (0.11-0.24 g/cm3) |

The chemical composition of the wood flour was 50.1% cellulose, 30.3% lignin, 9.7% dehemicellulose, 9.2% moisture and 0.7% ashes. The wood flour feedstock was dried overnight for 24 hours at 80° C. in air-circulating oven.

The extrusion compounding was performed in a twin screw co-rotational extruder Werner & Pfleiderer ZSK 30 mm according to the conditions set forth in Tables 2 and 3.

TABLE 2

| Extrusion parameters | |
|---|---|
| Output | 20 kg/h |
| Screw Rotation (RPM) | 210 |
| Torque | 44% |
| Screw diameter | 30 mm |

TABLE 3

| Temperatures profiles | | | | | | | | | |
|---|---|---|---|---|---|---|---|---|---|
| | ZONE | | | | | | | | |
| | 1 | 2 | 3 | 4 | 5 | 6 | 7 | 8 | 9 |
| Temp ° C. | 0 | 200 | 200 | 210 | 230 | 218 | 220 | 220 | 217 |

Polypropylene copolymer in pellets was fed with the additives to the hopper of a twin screw extruder while the wood flour was loaded through a gravimetric side feeders K-Tron type which was located after the plasticizing zone. The wood filler was compounded with the thermoplastic resin with moisture content below 8% wt. and dropped to 2% wt. after degassing within the venting zones. The processing temperature of the melt was monitored to be under 190° C. to avoid excessive heat exposition and premature degradation of the wood plastic composite. The processing lay-out was known as pre-dried wood and split feed.

All compositions were 70% Polypropylene copolymer with 30% woodflour (pinus). Thus samples codes such as "PPM" means 70% polypropylene plus 30% wood flour. "PP" alone indicates no wood flour was included. Additives were coded in terms of their functionality as follows:

| Light stabilizers | |
|---|---|
| UV-A | UVA + HALS blend. High molecular weight HALS (Hindered Amine Light Stabilizers) based on a synergistic combination of tertiary and secondary amines. |
| UV-B | UVA + HALS blend. HALS content = 47-53% wt., PP MFI = 10 carrier resin. UVA based on 2-hydroxy-benzophenone. |

| Thermal stabilizers | |
|---|---|
| E-A | 67% wt. organophosphite blended with 33% wt. of a hindered phenolic antioxidant. |
| E-B | 1:2 synergistic blend of an antioxidant 1,3,5-Tris(4-tert-butyl-3-hidroxy-2,6-dimethyl benzyl)-1,3,5-triazina-(1H,3H,% H)-trione and a Tris(2,4-di-t-butylphenyl) phosphite. |

| Compatibilizers | |
|---|---|
| C-A | Maleic Anhydride Grafted Polypropylene Melt Flow Index (ASTM D 1238 Method 190° C./2.16 kg) = 120 g/10 min. |
| C-B | Maleic Anhydride Grafted Polypropylene Melt Flow Index (ASTM D 1238 Method 190° C./2.16 kg) = 110 g/10 min. MAH graft index = 1.0% wt. |
| C-C | Tri-alkoxy silane. Molecular weight ~220.00 g/mol. |
| Polypropylene Wax - CPP | Maleic Anhydride modified polypropylene wax. Molecular weight obtained by GPC: Mn ~3.900 and Mw ~9.100 g/mol |

| Lubricant | |
|---|---|
| L | Modified stearic fat acids |

| Component | Content (wt %) | Product |
|---|---|---|
| Resin | 70.0 | Polypropylene copolymer |
| Thermal stabilizer (EA) | 0.3 | E-A, E-B |
| Light Stabilizer (UV) | 0.5 | UV-A, UV-B |
| Lubricant (L) | 1.0 | L |
| Compatibilizer (CA) | 3.0 | C-A, C-B, C-C, CPP |
| Wood flour (M) | 30 | *Pinus* mesh #35 |

Various samples were made with Table 4 providing a summary of the formulation for each sample.

TABLE 4

| Sample | Resin PP | Thermal Stabilizer EA | Thermal Stabilizer EB | Light Stabilizer UVA/UVB | Coupling Agent CA | Lubricant L | Wood Flour (M) |
|---|---|---|---|---|---|---|---|
| PP_UVA | X | | | X | | | |
| PP_EB_UVA | X | | X | X | | | |
| PP_EB_CA_UVA | X | | X | X | X | | |
| PPM_EB_CA | X | | X | | X | | X |
| PPM_EB_UVA | X | | X | X | | | X |
| *PPM_EB_CA_UVA | X | | X | X | X | | X |

TABLE 4-continued

| Sample | Resin PP | Thermal Stabilizer EA | Thermal Stabilizer EB | Light Stabilizer UVA/UVB | Coupling Agent CA | Lubricant L | Wood Flour (M) |
|---|---|---|---|---|---|---|---|
| *PPM_EA_CA_UVA | X | X | | X | X | | X |
| PPM_EB_CA_UVA_L | X | | X | X | X | X | X |
| PP_UVB | X | | | X | | | |
| PP_EB_UVB | X | | X | X | | | |
| PP_EB_CA_UVB | X | | X | X | X | | |
| PPM_EB_UVB | X | | X | X | | | X |
| *PPM_EB_CA_UVB | X | | X | X | X | | X |
| *PPM_EA_CA_UVB | X | X | | X | X | | X |
| PPM_EB_CA_UVB_L | X | | X | X | X | X | X |
| PPM_EB_CPP_UVA | X | | X | X | X | | X |
| PPM_EB_CPP_UVB | X | | X | X | X | | X |

Figure 2:
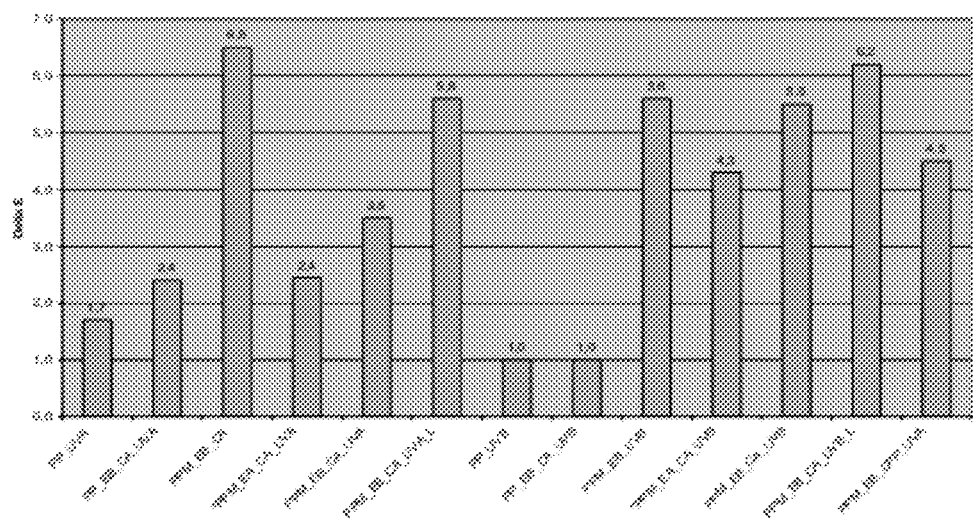
FIG. 2 is a graph of color shift data for various samples of wood-plastic composites.
Figure 3:
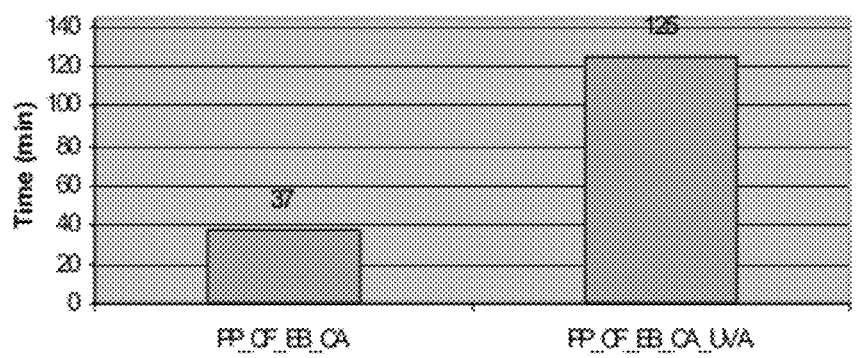
FIG. 3 is a graph of oxidative induction times of samples of polyolefin based vegetal fiber-plastic composites.
Figure 4:
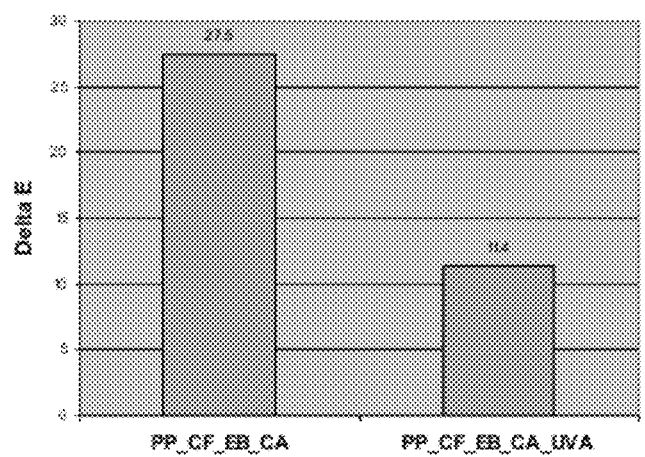
FIG. 4 is a graph of color shift data for samples of polyolefin based vegetal fiber-plastic composites.
Figure 5:
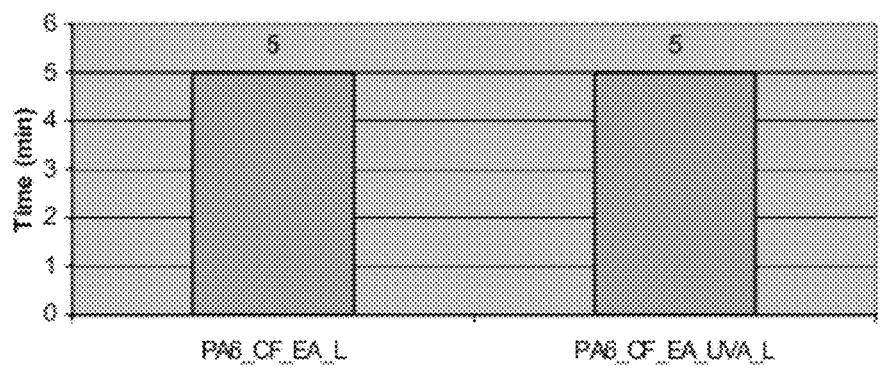
FIG. 5 is a graph of oxidative induction times of samples of polyamide based vegetal fiber-plastic composites.
Figure 6:
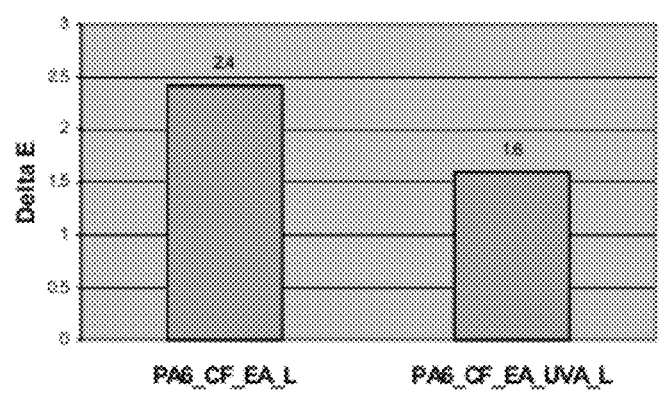
FIG. 6 is a graph of color shift data for samples of polyamide based vegetal fiber-plastic composites.

The wood-plastic composites were characterized using the following ASTM standards-Mechanical properties (ASTM D 638); Oxidative Induction Time, OIT (ASTM D 3895-98) performed at 200° C.; and Color shift (delta E), after UV Accelerated Aging, ASTM G155 (Xenon Arc), Daylight filter, wavelength 340 nm; UV exposition cycles of 102 min and 18 min light+water. Specimens 3"×6" Equipment: Atlas—Weather-o-Meter. Exposition time: 1000 h. The mechanical test results are shown in Table 5 and the oxidation and color shift results are graphically presented in FIGS. 1 and 2.

TABLE 5

| Sample | Tensile strength (MPa) | Tensile Elongation (%) |
|---|---|---|
| PP_UVA | 21.7 | 94.5 |
| PP_EB_CA_UVA | 23.4 | 50.7 |
| PPM_EB_CA_UVA | 23.2 | 4.8 |
| PPM_EB_CA_UVA_L | 21.3 | 4.1 |
| PP_UVB | 22.8 | 45.3 |
| PP_EB_CA_UVB | 24.2 | 34.6 |
| PPM_EB_UVB | 21.7 | 4.3 |
| PPM_EB_CA_UVB | 22.8 | 3.9 |
| PPM_EB_CA_UVB_L | 21.6 | 4.3 |
| PPM_EB_CPP_UVA | 21.2 | 3.6 |

As may be seen initially, for mechanical properties, as between UVA and UVB, there was little change in the mechanical properties for the various samples tested. The inclusion of wood flour substantially reduced tensile elongation but the tensile strength remained substantially the same.

As it relates to thermal resistivity, when wood flour (M) was added to neat polypropylene, there was no change in oxidative induction time (i.e. thermal stability)—with both samples at 15 minutes. The inclusion of a thermal stabilizer substantially increased the oxidative induction time, though EB was clearly better (120 minutes) as compared to EA (50 minutes). When wood flour was added, EB was still substantially better than EA, with the PPM_EB sample showing an oxidative induction time of 100, which was almost twice the oxidative induction time of the PPM_EA sample at 60 minutes. Additionally, even when a compatibilizer was added, in all instances, EB had a substantially better oxidative induction time than EA.

However, once a UV stabilizer is added, the surprising and unexpected synergy between wood flour and UVA can be recognized. Initially, it is noted that the UV stabilizer had little difference in the oxidative induction times of those samples including UVA or UVB and a thermal stabilizer (EA or EB). It can be seen that the presence of UVA or UVB results in oxidative induction times that are the same (90 minutes for PPM_EB_CA_UVA and PPM_EB_CA_UVB) or almost the same (40 minutes for PPM_EA_CA_UVA and 49 minutes for PPM_EA_CA_UVB).

However, when color shift data is examined, the synergy between wood flour and UVA may be seen. In samples with just neat polypropylene and a UV stabilizer, PP_UVB showed a lower Delta E (i.e. lower color shift) than PP_UVA and, therefore, provided better weatherability performance. This phenomena (UVB better performing that UVA) still existed when a thermal stabilizer and compatibilizer were present (PP_EB_CA_UVB had a Delta E of 1.0 while PP_EB_CA_UVA had a Delta E of 2.4).

However, once wood flour was added to the samples, the synergy between UVA and wood flour resulted in all such samples unexpectedly having better weatherability performance than those with UVB. PPM_EA_CA_UVA showed a Delta E of 2.4 as compared to PPM_EA_CA_UVB, which showed a Delta E of 4.3. PPM_EB_CA_UVA showed a Delta E of 3.5 as compared to PPM_EB_CA_UVB, which showed a Delta E of 5.5. Even when a lubricant was added, the UVA sample had a lower Delta E than the UVB sample (5.6 for PPM_EB_CA_UVA_L vs. 6.2 for PPM_EB_CA_UVB_L).

As such, samples having a combination of UVA as a UV stabilizer with wood flour showed unexpectedly better weatherability performance without adversely affecting thermal resistance and mechanical properties of the samples despite having a poorer performance as compared to UVB in the absence of wood flour. And samples containing EB as the thermal stabilizer and UVA and wood flour provided the best performance overall.

Example 2

The formulations for the Example 2 were prepared from the components listed in Table 6 below.

The manufacturing process of compositions having enhanced thermal resistance and UV resistance was performed as follows. Preparation of the wood plastic polyolefin-based composite was performed using a polypropylene copolymer (PPco) with vegetalfiber, thermal and UV stabilizers. The formulations used in this example, including the components and their amounts, are described in Table 6.

TABLE 6

| | Concentration (parts) | Product |
|---|---|---|
| Polypropylene Copolymer | 70-100 | Polypropylene copolymer Melt Flow Index 25 g/10 min |
| Thermal Stabilizers | 0.3 | Antioxidant blend systems containing 1,3,5-Tris(4-tert-butyl-3-hidroxy-2,6-dimethyl benzyl)-1,3,5-triazine-(1H,3H,% H)-trione and Tris (2,4-di-t-butylphenyl) phosphite |
| UV Stabilizers | 0.8 | UV stabilizers UVA + HALS blends and high molecular weight blend based on synergistic combination of tertiary and secondary amines. |
| Compatibilizer | 3.0 | Maleic Anhydride Grafted Polypropylene (1% graft/120 g/10 min) |
| Vegetalfiber | 0-30 | Curauá fiber (*Ananás erectofolius* of the species L. B. Smith) (0.1-15 mm length) |

The chemical composition of the Curauá fiber was 74% cellulose, 10% hemicellulose, 7% lignin, 8% moisture and 1% ashes.

The extrusion compounding was performed in a twin screw co-rotational extruder Werner & Pfleiderer ZSK 25 mm according to the conditions set forth in Tables 7 and 8.

TABLE 7

| Extrusion parameters | |
|---|---|
| Output | 18 kg/h |
| Screw Rotation (RPM) | 170 |
| Torque | 60% |
| Screw diameter | 25 mm |

TABLE 8

Temperatures profiles

| | ZONE | | | | |
|---|---|---|---|---|---|
| | 1 | 2 | 3 | 4 | 5 |
| Temp ° C. | 180 | 200 | 210 | 210 | 200 |

Polypropylene copolymer in pellets was fed with the additives to the hopper of a twin screw extruder while the wood flour was loaded through a gravimetric side feeders K-Tron type which was located after the plasticizing zone. The wood filler was compounded with the thermoplastic resin with moisture content below 8% wt. and dropped to 2% wt. after degassing within the venting zones. The processing temperature of the melt was monitored to be under 190° C. to avoid excessive heat exposition and premature degradation of the wood plastic composite. The processing lay-out was known as pre-dried wood and split feed.

All compositions were 80% Polypropylene copolymer with 20% Curauá fiber. Thus samples codes such as "PP_CF" means 80% Polypropylene plus 20% Curauá fiber. "PP" alone indicates no Curauá fiber was included. Additives were coded in terms of their functionality as follows:

| Light stabilizers | |
|---|---|
| UV-A | UVA + HALS blend. High molecular weight HALS (Hindered Amine Light Stabilizers) based on a synergistic combination of tertiary and secondary amines. |

| Thermal stabilizers | |
|---|---|
| E-B | 1:2 synergistic blend of an antioxidant 1,3,5-Tris(4-tert-butyl-3-hidroxy-2,6-dimethyl benzyl)-1,3,5-triazina-(1H,3H,% H)-trione and a Tris(2,4-di-t-butylphenyl) phosphite. |

| Compatibilizers | |
|---|---|
| C-A | Maleic Anhydride Grafted Polypropylene Melt Flow Index (ASTM D 1238 Method 190° C./2.16 kg) = 120 g/10 min. |

| Component | Content (parts) | Product |
|---|---|---|
| Resin | 80.0 | Polypropylene copolymer |
| Thermal stabilizer (EA) | 0.3 | E-B |
| Light Stabilizer (UV) | 0.8 | UV-A |
| Compatibilizer (CA) | 3.0 | C-A |
| Curauá fiber (CF) | 20.0 | Natural Curauá Fiber (length 0.1-15 mm) |

Two samples were made with Table 9 providing a summary of the formulation for each sample.

TABLE 9

| Sample | Resin PP | Thermal Stabilizer EB | Light Stabilizer UVA | Coupling Agent CA | Curauá Fiber (CF) |
|---|---|---|---|---|---|
| PP_CRF_EB_CA | X | X | | X | X |
| PP_CRF_EB_CA_UVA | X | X | X | X | X |

The Curauá fiber-plastic composites were characterized using the following ASTM standards-Oxidative Induction Time, OIT (ASTM D 3895-98) performed at 200° C.; and Color shift (delta E), after UV Accelerated Aging, ASTM G155 (Xenon Arc), Daylight filter, wavelength 340 nm; UV exposition cycles of 102 min and 18 min light+water. Specimens 3"×6" Equipment: Atlas—Weather-o-Meter. Exposition time: 1000h.

Once a UV stabilizer is added, it is noted that the UV stabilizer had difference in the oxidative induction times of the samples. It can be seen that the presence of UVA results in longer oxidative induction times (37 minutes for PP_CF_E-B_CA and 125 minutes for PP_CF_EB_CA_UVA).

When color shift data is examined, the results of Delta E are quite different for the two samples. The sample in which was used a UV stabilizer system, exhibited, after Accelerated Aging, Delta E of 11.4 while the non-stabilized sample exhibited a Delta E of 27.5.

Example 3

The formulations for the Example 3 were prepared from the components listed in Table 10 below.

The manufacturing process of compositions having enhanced thermal resistance and UV resistance was performed as follows. Preparation of the wood-plastic polyamide-based composite was performed using a Polyamide 6, a vegetal fiber, black masterbatch, thermal and UV stabilizers. The formulations used in this example, including the components and their amounts, are described in Table 10.

TABLE 10

| Components | | |
|---|---|---|
| | Concentration (parts) | Product |
| Polyamide 6 | 70-100 | Polyamide 6 |
| Thermal Stabilizers | 0.6 | Blends of low volatility and high resistant to hydrolysis organophosphites and hindered phenolic antioxidants |
| Lubricants (L) | 1.0 | Modified fatty acid ester |
| UV Stabilizers | 1.1 | UV stabilizers UVA + HALS blends and high molecular weight blend based on synergistic combination of tertiary and secondary amines. |
| Vegetalfiber | 0-30 | Curauá fiber (*Ananás erectofolius* of the species L. B. Smith) (0.1-15 mm length) |

The chemical composition of the Curauá fiber was 74% cellulose, 10% hemicellulose, 7% lignin, 8% moisture and 1% ashes.

The extrusion compounding was performed in a twin screw co-rotational extruder Werner & Pfleiderer ZSK 58 mm Megaplus compounder according to the conditions set forth in Tables 11 and 12.

TABLE 11

| Extrusion parameters | |
|---|---|
| Output | 250 kg/h |
| Screw Rotation (RPM) | 450 |
| Torque | 65% |
| Screw diameter | 58 mm |

TABLE 12

| Temperatures profiles | | | | | | | | | | | | |
|---|---|---|---|---|---|---|---|---|---|---|---|---|
| ZONE | | | | | | | | | | | | |
| | 1 | 2 | 3 | 4 | 5 | 6 | 7 | 8 | 9 | 10 | 11 | 12 |
| Temp ° C. | 0 | 100 | 220 | 230 | 210 | 200 | 195 | 200 | 200 | 200 | 200 | 200 |

Polyamide 6 in pellets was fed with the additives to the hopper of a twin screw extruder while the vegetal fiber was loaded through a gravimetric side feeders K-Tron type which was located after the plasticizing zone. The processing temperature of the melt was monitored to be under 190° C. to avoid excessive heat exposition and premature degradation of the wood plastic composite.

All compositions were 80% Polyamide 6 with 20% Curauá fiber besides additives. Thus samples codes such as "PA6_CF" means 80% polyamide plus 20% Curauá fiber in weight. "PA6" alone indicates no Curauá fiber was included. Additives were coded in terms of their functionality as follows:

| Light stabilizers | |
|---|---|
| UV-A | UVA + HALS blend. High molecular weight HALS (Hindered Amine Light Stabilizers) based on a synergistic combination of tertiary and secondary amines. |

| Thermal stabilizers | |
|---|---|
| E-A | 67% wt. organophosphite blended with 33% wt. of a hindered phenolic antioxidant. |

| Lubricant | |
|---|---|
| L | Modified stearic fat acids |

| Component | Content (parts) | Product |
|---|---|---|
| Resin | 80.0 | Polyamide 6 |
| Thermal stabilizer (EA) | 0.6 | E-A |
| Light Stabilizer (UV) | 1.1 | UV-A |
| Lubricant (L) | 1.0 | L |
| Curauá fiber (CF) | 20.0 | Natural Curauá Fiber (length 0.1-15 mm) |

Two samples were made with Table 13 providing a summary of the formulation for each sample.

TABLE 13

| Sample | Resin PA6 | Thermal Stabilizer EA | Light Stabilizer UVA | Lubricant L | Curauá fiber (CF) |
|---|---|---|---|---|---|
| PA6_CRF_EA_L | X | X | | X | X |
| PA6_CRF_EA_UVA_L | X | X | X | X | X |

The Curauá fiber-plastic composites were characterized based on the following ASTM standards-Oxidative Induction Time, OIT (ASTM D 3895-98) performed at 250° C.; and Color shift (delta E), after UV Accelerated Aging, ASTM G155 (Xenon Arc), Daylight filter, wavelength 340 nm; UV exposition cycles of 102 min and 18 min light+water. Specimens 3"×6" Equipment: Atlas—Weather-o-Meter. Exposition time: 1000 h.

Once a UV stabilizer is added, it is noted that the UV stabilizer had little difference in the oxidative induction times of the samples. It can be seen that the presence of UVA results in oxidation induction times that are the same (5 minutes for PA6_CF_EA_L and PA6_CF_EA_UVA_L).

However, when color shift data is examined, the results of Delta E for the sample in which was used a UV stabilizer system, after Accelerated Aging, was Delta E of 1.6 while non-stabilized sample exhibited a Delta E of 2.4.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A wood-plastic polymer composition comprising:
a blend of
a) from 40 to 90 wt % of a thermoplastic resin;
b) from 10 to 60 wt % of a wood filler;
c) from 0.1 to 0.8 wt % of a thermal stabilizer comprising a blend of 1,3,5-Tris(4-tert-butyl-3-hydroxy-2,6-dimethyl benzyl)-1,3,5-triazine-(1H,3H,5H)-trione and Tris (2,4-di-t-butylphenyl)phosphite; and
d) from 0.01 to 1.0 wt % of an ultraviolet stabilizer comprising a blend of an ultraviolet absorber and a hindered amine light stabilizer,
wherein the wood-plastic polymer composition has an oxidation induction time of at least 90 minutes.

2. The composition of claim 1, wherein the thermoplastic resin is selected from polypropylene homopolymer, polypropylene copolymer, ethylene propylene diene monomer (EPDM), maleated propylene diene monomer (m-EPDM), ethylene-polypropylene copolymer, maleated ethylene-polypropylene copolymer (m-EP copolymers), a thermoplastic elastomer, a thermoplastic rubber, ethylene/vinyl acetate copolymer (EVA), a poly(4-methyl-1-pentene) homopolymer, poly(4-methyl-1-pentene/1-decene) copolymer, very low density polyethylene (VLDPE), (m) low density polyethylene (LDPE), medium density polyethylene (MDPE), high density polyethylene (HDPE), linear low density polyethylene (LLDPE), crosslinked polyethylene (XLPE), crosslinked polypropylene (XLPP), nylon-6, nylon-6,6, nylon-4, nylon-4,6, nylon-12, nylon-6,10, nylon-6,9, nylon-6,12, nylon-9T, copolymer of nylon-6,6 and nylon-6, polyamide copolymers, polyamide blends, or a combination including at least one of the foregoing resins.

3. The composition of claim 1, wherein the wood filler comprises wood flour, vegetal fibers, or a combination including wood flour and vegetal fibers.

4. The composition of claim 1, wherein the ultraviolet absorber is selected from benzophenones and benzotriazoles.

5. The composition of claim 1, wherein the thermoplastic resin comprises from 1 to 30 wt % of a polyamide blended with a polyolefin or from 1 to 30 wt % of a polyolefin blended with a polyamide.

6. The composition of claim 5, wherein the polyamide is selected from nylon-6, nylon-6,6, nylon-4, nylon-4,6, nylon-12, nylon-6,10, nylon-6,9, nylon-6,12, nylon-9T, copolymer of nylon-6,6 and nylon-6, polyamide copolymers, polyamide blends and combinations thereof.

7. The composition of claim 5, wherein the polyolefin is selected from polypropylene homopolymer, polypropylene copolymer, ethylene propylene diene monomer (EPDM), maleated propylene diene monomer (m-EPDM), ethylene-polypropylene copolymer, maleated ethylene-polypropylene copolymer (m-EP copolymers), a thermoplastic elastomer, a thermoplastic rubber, ethylene/vinyl acetate copolymer (EVA), a poly(4-methyl-1-pentene) homopolymer, poly(4-methyl-1-pentene/1-decene) copolymer, very low density polyethylene (VLDPE), (m) low density polyethylene (LDPE), medium density polyethylene (MDPE), high density polyethylene (HDPE), linear low density polyethylene (LLDPE), crosslinked polyethylene (XLPE), crosslinked polypropylene (XLPP) and combinations thereof.

8. The composition of claim 1, further comprising a compatibilizer.

9. The composition of claim 1, wherein the delta E of the wood-plastic polymer composition is 11.4 or less.

10. An article of manufacture comprising the composition of claim 1.

11. A method for forming a wood-plastic polymer composition comprising the steps of:
blending
a) from 40 to 90 wt % of a thermoplastic resin,
b) from 10 to 60 wt % of a wood filler;
c) from 0.1 to 0.8 wt % of a thermal stabilizer comprising a blend of 1,3,5-Tris(4-tert-butyl-3-hydroxy-2,6-dimethyl benzyl)-1,3,5-triazine-(1H,3H,5H)-trione and Tris (2,4-di-t-butylphenyl)phosphite; and
d) from 0.01 to 1.0 wt % of an ultraviolet stabilizer comprising a blend of an ultraviolet absorbers and a hindered amine light stabilizer; and
molding the polymer composition,
wherein the wood-plastic polymer composition has an oxidation induction time of at least 90 minutes.

12. The method of claim 11, wherein the thermoplastic resin selected from polypropylene homopolymer, polypropylene copolymer, ethylene propylene diene monomer (EPDM), maleated propylene diene monomer (m-EPDM), ethylene-polypropylene copolymer, maleated ethylene-polypropylene copolymer (m-EP copolymers), a thermoplastic elastomer, a thermoplastic rubber, ethylene/vinyl acetate copolymer (EVA), a poly(4-methyl-1-pentene) homopolymer, poly(4-methyl-1-pentene/1-decene) copolymer, very low density polyethylene (VLDPE), (m) low density polyethylene (LDPE), medium density polyethylene (MDPE), high density polyethylene (HDPE), linear low density polyethylene (LLDPE), crosslinked polyethylene (XLPE), crosslinked polypropylene (XLPP), nylon-6, nylon-6,6, nylon-4, nylon-4,6, nylon-12, nylon-6,10, nylon-6,9, nylon-6,12, nylon-9T, copolymer of nylon-6,6 and nylon-6, polyamide copolymers, polyamide blends, or a combination including at least one of the foregoing resins.

13. The method of claim 11, wherein the wood filler comprises wood flour, vegetal fibers, or a combination including wood flour and vegetal fibers.

14. The method of claim 11, wherein the ultraviolet absorber is selected from benzophenones and benzotriazoles.

15. The method of claim 11, wherein the thermoplastic resin comprises from 1 to 30 wt % of a polyamide blended with a polyolefin or from 1 to 30 wt % of a polyolefin blended with a polyamide.

16. The method of claim 15, wherein the polyamide is selected from nylon-6, nylon-6,6, nylon-4, nylon-4,6, nylon-12, nylon-6,10, nylon-6,9, nylon-6,12, nylon-9T, copolymer of nylon-6,6 and nylon-6, polyamide copolymers, polyamide blends and combinations thereof.

17. The method of claim 15, wherein the polyolefin is selected from polypropylene homopolymer, polypropylene copolymer, ethylene propylene diene monomer (EPDM), maleated propylene diene monomer (m-EPDM), ethylene-polypropylene copolymer, maleated ethylene-polypropylene copolymer (m-EP copolymers), a thermoplastic elastomer, a thermoplastic rubber, ethylene/vinyl acetate copolymer (EVA), a poly(4-methyl-1-pentene) homopolymer, poly(4-methyl-1-pentene/1-decene) copolymer, very low density polyethylene (VLDPE), (m) low density polyethylene (LDPE), medium density polyethylene (MDPE), high density polyethylene (HDPE), linear low density polyethylene (LLDPE), crosslinked polyethylene (XLPE), crosslinked polypropylene (XLPP) and combinations thereof.

* * * * *